G. C. HEILMAN.

HEATING ARRANGEMENT FOR KILNS AND OTHER STRUCTURES.

APPLICATION FILED AUG. 13, 1919.

Reissued Oct. 26, 1920. 14,972.

Inventor
Guy C. Heilman

By his Attorney
John Lotka

UNITED STATES PATENT OFFICE.

GUY C. HEILMAN, OF PHILADELPHIA, PENNSYLVANIA.

HEATING ARRANGEMENT FOR KILNS AND OTHER STRUCTURES.

14,972. Specification of Reissued Letters Patent. Reissued Oct. 26, 1920.

Original No. 1,237,036, dated August 14, 1917, Serial No. 124,755, filed October 10, 1916. Application for reissue filed August 13, 1919. Serial No. 317,391.

*To all whom it may concern:*

Be it known that I, GUY C. HEILMAN, a citizen of the United States, residing in the city of Philadelphia, county of Philadelphia, and State of Pennsylvania, have invented certain new and useful Improvements in Heating Arrangements for Kilns and other Structures, of which the following is a specification.

My invention relates to means for supplying combustion heat to brick-kilns and other structures requiring furnaces or heating arrangements, and has for its object to provide improved means for the thorough mixing and combining or combustion of fuel and air, and for discharging the heated products of combustion into the structure, or into the chamber to be heated, in such a way as to secure an even distribution of the heat. When applied to a brick-kiln, my invention will cause the heated products of combustion to be brought in contact with the green bricks in such a manner as to burn the same expeditiously and uniformly, without the usual smoke and dust.

In carrying out my invention, in its preferred form, I provide a novel arrangement of fuel and air passages, to cause the air to be heated before it is brought in contact with the fuel, and to obtain an efficient combustion of the mixture.

Figure 1:
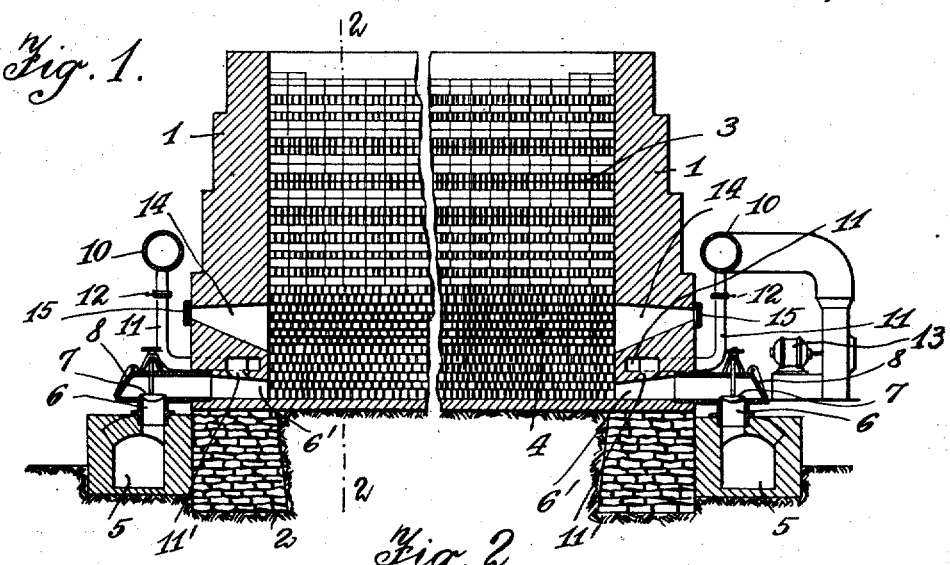
Figure 2:
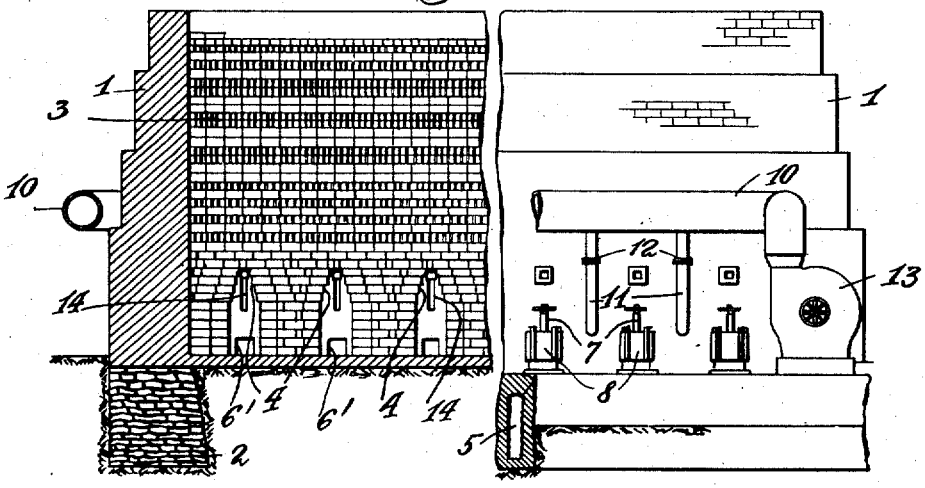
Figure 4:
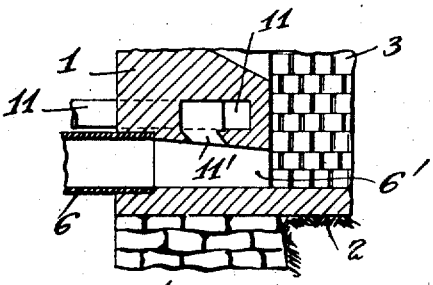
Figure 3:
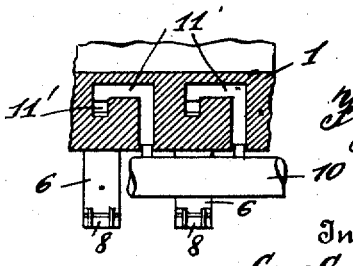

As a specific example of my invention, its application to a brick-kiln has been illustrated in the accompanying drawings, Figure 1 being a vertical section through such brick-kiln; Fig. 2 is partly a side elevation of the kiln and partly a vertical section on the line 2—2 of Fig. 1, Fig. 2 therefore being a view taken at right angles to Fig. 1; Fig. 3 is a partial horizontal section of certain details; and Fig. 4 is a vertical section showing, upon an enlarged scale, some of the parts appearing in Fig. 1.

It will be understood that I do not desire to limit myself to the specific details shown in this example, and that various modifications may be made without departing from the nature of my invention as set forth in the appended claims.

The brick-kiln illustrated in the accompanying drawings comprises walls 1 supported by suitable foundations 2, said walls forming a chamber for the reception of the bricks 3, which are stacked loosely to provide spaces for the passage of the hot gases, as hereinafter referred to, said bricks being also laid so as to form arches 4 extending from one side of the chamber to the other, the spacing of the bricks at such arches being such that the hot gases admitted into said arches as described below, will be able to pass laterally and upwardly into and through the stack of bricks. The green bricks are preferably stacked in such a manner as to produce arches 4 at regular intervals, see Fig. 2. Conduits 5 conveying fuel gas are provided on opposite sides of the kiln and are connected with the interior thereof, that is to say, with the kiln chamber, by branches or passages 6, which in the particular construction shown are angular, each of them comprising a section extending upwardly from the fuel conduit or fuel main 5, and a horizontal section extending from the upper end of said vertical or upward section through the bottom portion of the adjacent wall 1 so as to communicate with the kiln chamber, at one of the arches 4 provided in the stacked bricks 3; that is to say, in stacking the bricks, the arches 4 are formed at points in registry with the discharge ends of the passages 6, it being understood that such discharge ends are arranged in pairs, in longitudinal registry at opposite sides of the kiln chamber, so that one passage 6 of a pair will discharge into one end of an arch 4, while the other passage 6 of the same pair will discharge into the opposite ends of the same arch 4. The flow of fuel gas from the conduits 5 through the passages 6 is regulated by valves 7, and access is provided to said passages, and especially to the horizontal sections thereof, by doors 8 which permit inspection and cleaning readily.

For reasons set forth fully hereinafter, I prefer to make the passages 6 tapering or contracted toward their outlets or discharge ends, such contracted portions being designated as 6′ in Figs. 1 and 4.

Air conduits 10 are disposed on opposite sides of the kiln and are connected by passages 11 with the respective passages 6, 6′ within the walls 1, each passage 11 being controlled individually by means of a valve 12. It will be observed that substantial parts of the passages 11 are disposed within the walls 1, and that, in order to increase the length of the passage portion contained within the respective wall 1, such portion is not straight, but angular, the passage 11, in the particular construction illustrated best by Fig. 3, extending first inwardly, then laterally, and finally forwardly to the outlet or nozzle 11′ by means of which said passage communicates with the fuel passage. It will be noted that the nozzle 11′ enters the fuel passage 6, or communicates therewith, at the contracting discharge portion 6′, and furthermore, that the nozzle is disposed obliquely, so as to discharge air into the fuel passage toward the outlet thereof. It will be understood that the air is heated as it travels through the portion of the passage 11 which is located within the wall 1, since the latter is heated by the combustion products passing through the discharge portions of the passages 6 and through the chamber of the kiln. The air is thus heated before it comes in contact with the fuel gas in the inner portions of the passages 6, said inner portions forming combustion chambers. A blower 13 supplies air to the conduits 10 at the desired pressure.

The contraction of the fuel passage at its discharge portion 6′ will cause a checking or retarding of the flow in said tapered or contracted portion 6′, thus giving the fuel gas and the air a better opportunity to mix and burn thoroughly between the nozzle 11′ and the discharge orifice of the respective passage 6, 6′. This action is further enhanced by the oblique direction of the nozzle 11′, which causes the heated air to produce a sort of whirling action in the combustion chamber proper, and the best results are obtained when, as shown, the oblique air-nozzle 11′ communicates with the fuel passage at the tapering or gradually-contracting portion thereof, to assist the proper flow of air and gas toward the discharge orifice and into the arch 4, and the thorough mixing and combustion within the passages 6, 6′, so that there is no flame within the main kiln chamber, or practically none. The products of combustion entering the arches 4 through the orifices at the inner ends of the passages 6, 6′, flow through said arches, from which they are disseminated laterally and upwardly through the properly spaced bricks, which are heated uniformly and expeditiously thereby, without the smoke and waste attending usual brick-burning operations.

As regards the valve 7, it will be noted that it is located at the junction of the vertical or upward section of the fuel passage 6 with the horizontal section of said passage, while the door 8 is located at the outer end of said horizontal section; thus it is possible to shut the valve 7 of any one of said passages and then open the door 8 to obtain access to the upper or horizontal section of such passage without risking an escape of fuel gas from the upper end of the upward or vertical section of the passage, which section remains in communication with the respective fuel-gas conduit 5; the valve stem does not form a sufficient obstruction to prevent inspection or cleaning of the horizontal section when the door 8 is open.

Peep-holes 14 are formed in the walls 1 above the passages 6, expanding from the outside inwardly, said peep-holes being located adjacent to the respective passages 6 and providing means for viewing the spaces within the arches 4, the outer ends of said holes being covered by transparent covers 15, such as plates of mica.

It will be understood that, corresponding to the arrangement of the stacked bricks 3 in such a manner as to place the arches 4 at regular intervals, I prefer to space the fuel-gas passages 6, 6′ evenly, as well as the peep-holes 14 and the air-passages 11, as will be seen by reference to Figs. 2 and 3.

I claim as my invention:

1. A kiln or other structure having walls forming a heating chamber, a fuel conduit extending through a wall aforesaid and discharging into said chamber, an air conduit communicating with said fuel conduit within said wall thereby producing a mixture of air and fuel within said wall, and an arch into and through which the heated products of combustion flow.

2. A kiln or other structure having walls forming a heating chamber, a plurality of spaced fuel passages extending through a wall aforesaid to said chamber, a plurality of air passages extending through said wall to the respective fuel passages, thereby producing a mixture of air heated by said wall and of fuel in the first-named passages, and arches into and through which the heated products of combustion flow.

3. A kiln or other structure having walls forming a heating chamber, a fuel conduit having a plurality of passages extending through a wall aforesaid to said chamber, valves for controlling the flow of fuel through said passages and doors for permitting access to said passages, in combination with an air conduit having a plurality of passages extending through said wall to the respective fuel passages to effect within said wall a mixture of fuel and heated air, and valves for controlling said air passages.

4. A kiln or other structure having a heated wall, passages for supplying a heating medium through said wall, arches into which said passages discharge, and peep-holes extending through said wall adjacent to the respective passages, each peep-hole opening into the same arch as the adjacent passage.

5. A kiln or other structure having walls forming a heating chamber, a transverse fuel conduit extending through a wall aforesaid and discharging into said chamber, and an air conduit communicating with said fuel conduit within said wall at a point between the ends of said transverse conduit, thereby producing a mixture of air and fuel within said wall.

6. A kiln or other structure having walls forming a heating chamber, a plurality of spaced transverse fuel passages extending through a wall aforesaid to said chamber, and a plurality of air passages extending into said wall and communicating with the respective fuel passages at points within said wall exteriorly of the inner ends of said transverse fuel passages, thereby producing a mixture of air heated by said wall and of fuel in the first-named passages.

7. In a heating arrangement for kilns and other structures, a fuel passage having a discharge end at an angle to the vertical and a portion tapering toward the discharge end of the passage, and an air passage arranged to discharge air into said tapered portion at a distance from the discharge end of the fuel passage, whereby air and fuel will be caused to mix before reaching the discharge end of the fuel passage.

8. In a heating arrangement for kilns and other structures, a fuel passage having a discharge outlet directed at an angle to the vertical, and an air passage discharging into the side of said fuel passage at a distance from said outlet, said fuel passage having, between its outlet and the discharge end of the air passage, a portion tapering toward said outlet.

9. In a heating arrangement for kilns and other structures, a fuel passage having a portion tapering toward the outlet, and an air passage having a discharge end disposed obliquely and communicating with said fuel passage at said tapering portion thereof.

10. In a heating arrangement for kilns and other structures, a fuel passage having an outlet, and an air passage having a discharge end ranging obliquely and lengthwise of the fuel passage and communicating therewith at a distance from the outlet of said fuel passage.

11. In a heating arrangement for kilns and other structures, a heated wall, a transverse fuel passage, and an air passage of varying direction extending within said wall and communicating with said transverse fuel passage at a point exteriorly of the inner end of said passage.

12. In a heating device, a fuel conduit of gradually-varying cross section, and an air-supply passage discharging obliquely through the wall of said conduit toward the outlet of such conduit.

13. In a heating device, a fuel conduit having a wall oblique with reference to the axis of said conduit, and an air-supply passage discharging obliquely through such oblique wall toward the outlet of such conduit.

14. In a heating arrangement for kilns and other structures, a fuel passage having a discharge section and a supply section at an angle to said discharge section, and connected therewith between the ends of the discharge section, a valve at the junction of said sections, a door at the end of the discharge section opposite to its outlet end, and an air passage connected with said fuel passage at a point between its outlet end and the junction of its two sections.

15. In a heating arrangement for kilns and other structures, a heated wall, passages for supplying a heating medium, arches into which said passages discharge, and peep-holes extending through said wall adjacent to the respective passages, said peep-holes expanding from the outside inwardly to afford a greater field of vision, and each peep-hole opening into the same arch as the adjacent passage.

In testimony whereof I have signed this specification.

GUY C. HEILMAN.